US006950885B2

(12) United States Patent
Shah

(10) Patent No.: US 6,950,885 B2
(45) Date of Patent: Sep. 27, 2005

(54) MECHANISM FOR PREVENTING UNNECESSARY TIMEOUTS AND RETRIES FOR SERVICE REQUESTS IN A CLUSTER

(75) Inventor: Rajesh R. Shah, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 845 days.

(21) Appl. No.: 09/961,367

(22) Filed: Sep. 25, 2001

(65) Prior Publication Data

US 2003/0061367 A1 Mar. 27, 2003

(51) Int. Cl.[7] ................................................ G06F 3/00
(52) U.S. Cl. ........................................ 710/36; 709/235
(58) Field of Search ........................... 710/36; 709/203, 709/228, 226, 230, 235; 714/748

(56) References Cited

U.S. PATENT DOCUMENTS

| | | | | |
|---|---|---|---|---|
| 5,719,882 | A | * | 2/1998 | Ellis ............................ 714/749 |
| 6,405,337 | B1 | * | 6/2002 | Grohn et al. ................ 714/749 |
| 6,587,950 | B1 | | 7/2003 | Shah et al. .................. 713/300 |
| 6,591,309 | B1 | | 7/2003 | Shah .............................. 710/2 |
| 6,681,251 | B1 | * | 1/2004 | Leymann et al. ............ 709/226 |
| 6,694,361 | B1 | | 2/2004 | Shah et al. .................. 709/222 |
| 6,725,386 | B1 | | 4/2004 | Shah ............................ 713/320 |
| 6,738,818 | B1 | | 5/2004 | Shah ............................ 709/228 |
| 6,757,242 | B1 | | 6/2004 | Wang et al. .................. 370/216 |
| 6,766,470 | B1 | | 7/2004 | Shah .............................. 714/9 |
| 6,772,320 | B1 | | 8/2004 | Raj ............................ 712/225 |
| 6,810,418 | B1 | | 10/2004 | Shah et al. .................. 709/223 |
| 2002/0133593 | A1 | * | 9/2002 | Johnson et al. ............. 709/226 |
| 2002/0133633 | A1 | | 9/2002 | Arvind ........................ 703/310 |
| 2003/0065775 | A1 | | 4/2003 | Aggarwal .................... 709/225 |
| 2003/0103455 | A1 | | 6/2003 | Pinto ........................... 370/230 |

OTHER PUBLICATIONS

Shah et al., "A Mechanism For Reporting Topology Changes To Clients In A Cluster"., U.S. Appl. No. 09/942,608., Intel Corporation.
Pinto et al., "A Mechanism For Managing Incoming Data Messages In A Cluster"., U.S. Appl. No. 09/994,779., Intel Corporation.
Shah et al., "A Cluster With Multiple Paths Between Hosts And I/O Controllers"., U.S. Appl. No. 09/450,381., Intel Corporation.
Raj., "Method And Device For Discovering Round Trip Delyas Between Nodes In An Infiniband Cluster"., U.S. Appl. No. 09/669,668., Intel Corporation.
Shah., "System And Method For Providing Detailed Path Information To Clients"., U.S. Appl. No. 09/694,492., Intel Corporation.
Teitenberg et al., "Method And Apparatus For Distributing Events Among Multiple Channel Drivers"., U.S. Appl. No. 09/654,069., Intel Corporation.
Shah et al., "Path Removal For Highly Connected Clusters"., U.S. Appl. No. 09/658,491., Intel Corporation.
Shah., "Method And Apparatus For Determining Multiple Instances Of The Same Type Of Service Agent"., U.S. Appl. No. 09/653,585., Intel Corporation.
Shah., "Dynamic Removal Of A Driver Stack When A Parent Driver Uses A Child Driver"., U.S. Appl. No. 09/631,873., Intel Corporation.
Shah., "Delaying Of Loading Host–Side Drivers For Cluster Resources To Avoid Communication Failures"., U.S. Appl. No. 09/608,632., Intel Corporation.

* cited by examiner

Primary Examiner—Jeffrey Gaffin
Assistant Examiner—Harold Kim
(74) Attorney, Agent, or Firm—Rob D. Anderson

(57) ABSTRACT

A dynamic workload feedback mechanism is provided at a service provider to notify a client a current workload of the service provider in a switched fabric in order to prevent unnecessary timeouts and retries of duplicate service requests.

24 Claims, 6 Drawing Sheets

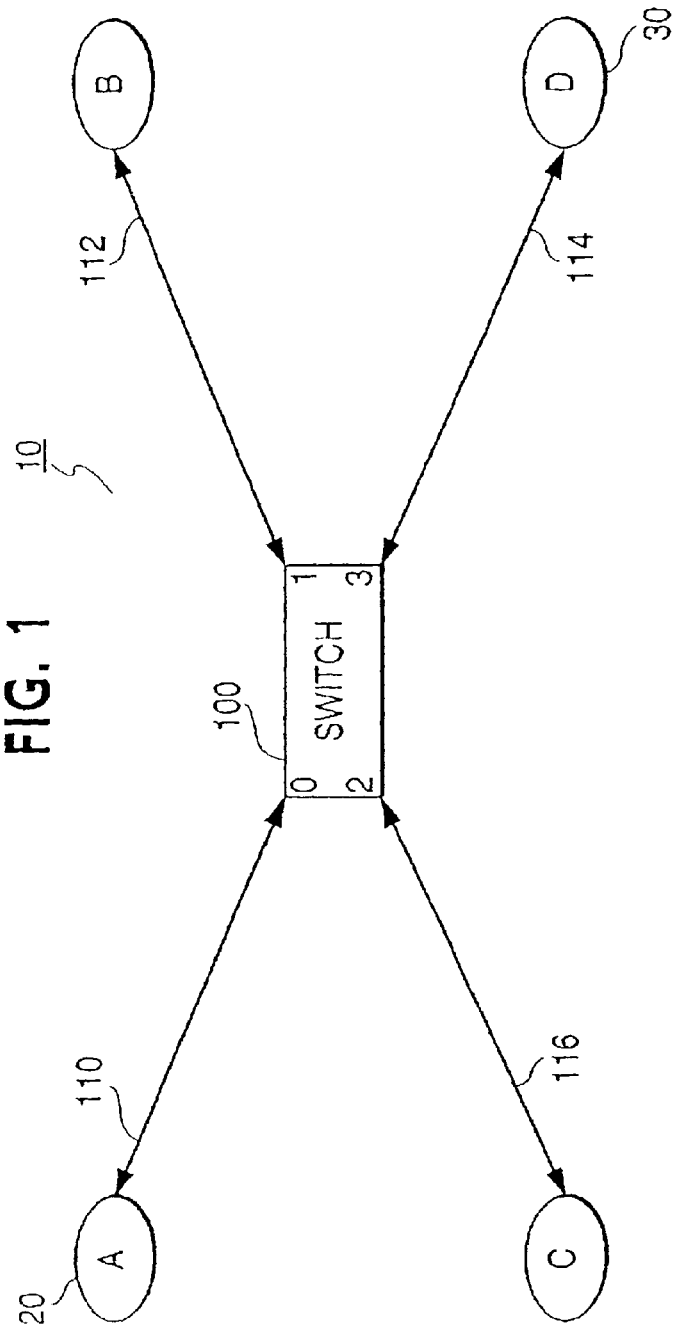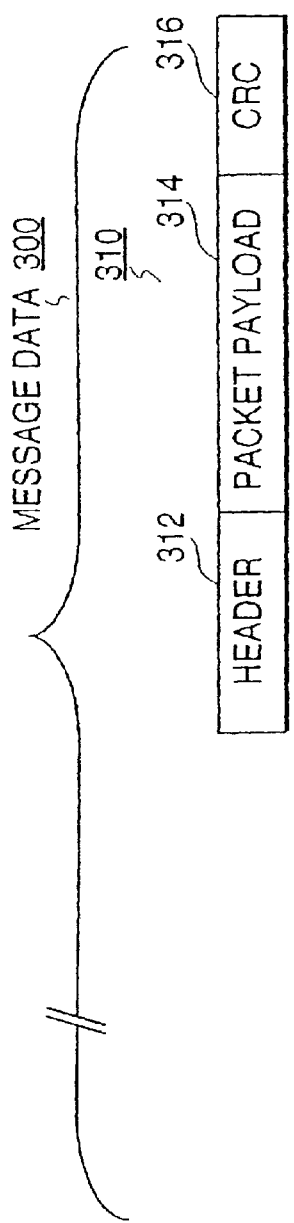

US 6,950,885 B2

MECHANISM FOR PREVENTING UNNECESSARY TIMEOUTS AND RETRIES FOR SERVICE REQUESTS IN A CLUSTER

TECHNICAL FIELD

The present invention relates to data transfer interface technology in a data network, and more particularly, relates to a mechanism for preventing unnecessary timeouts and retries for service requests in a cluster.

BACKGROUND

As high-speed and high-performance communications become necessary for many applications such as data warehousing, decision support, mail and messaging, and transaction processing applications, a clustering technology has been adopted to provide availability and scalability for these applications. A cluster is a group of one or more host systems (e.g., computers, servers and workstations), input/output (I/O) units which contain one or more I/O controllers (e.g. SCSI adapters, network adapters etc.) and switches that are linked together by an interconnection fabric to operate as a single data network to deliver high performance, low latency, and high reliability. Clustering offers three primary benefits: scalability, availability, and manageability. Scalability is obtained by allowing servers and/or workstations to work together and to allow additional services to be added for increased processing as needed. The cluster combines the processing power of all servers within the cluster to run a single logical application (such as a database server). Availability is obtained by allowing servers to "back each other up" in the case of failure. Likewise, manageability is obtained by allowing the cluster to be utilized as a single, unified computer resource, that is, the user sees the entire cluster (rather than any individual server) as the provider of services and applications.

Emerging network technologies for linking servers, workstations and network-connected storage devices within a cluster include InfiniBand™ and its predecessor, Next Generation I/O (NGIO) which have been recently developed by Intel Corp. and other companies to provide a standard-based I/O platform that uses a channel oriented, switched fabric and separate I/O channels to meet the growing needs of I/O reliability, scalability and performance on commercial high-volume servers, as set forth in the "*Next Generation Input/Output (NGIO) Specification,*" NGIO Forum on Jul. 20, 1999 and the "*InfiniBand™ Architecture Specification,*" the InfiniBand™ Trade Association on Oct. 24, 2000.

One major challenge to implementing clusters based on NGIO/InfiniBand technology is to ensure that data messages traverse reliably between given ports of a data transmitter (source node) and a data receiver (destination node), via one or more given transmission (redundant) links of a switched fabric data network. Therefore, service (work) requests from fabric-attached InfiniBand™ clients (e.g., remote systems) to a service provider (e.g., host system) must be properly acknowledged by the service provider (host system) within a certain amount of time. Otherwise, service requests or response messages can get lost in the switched fabric data network. In addition, a lot of cluster bandwidth can be wasted if the fabric-attached InfiniBand™ clients generate unnecessary timeouts and retries for service requests, via data paths in the switched fabric data network.

Currently there are some basic mechanisms defined in the InfiniBand™ Architecture Specification set forth on Oct. 24, 2000 to allow InfiniBand™ clients to determine a response time from a service provider in the switched fabric data network before timing out and retrying service requests. However, these currently defined mechanisms are only intended to compute timeouts based on values that are programmed statistically and do not take in account delays that contribute to the amount of time an InfiniBand™ client has to wait before timing out and retrying a service requests, and dynamic variations as a result of fabric congestion or temporary overload of specific service providers. In addition, no mechanism is provided from the InfiniBand™ Architecture Specification to obtain information regarding the current workload of a service provider and generate dynamic feedback to InfiniBand™ clients about the current workload of the service provider in order to avoid premature timeouts and unnecessary retries. As a result, cluster bandwidth can be wasted generating unnecessary retries and responses to the retries.

Accordingly, there is a need for a more client friendly and less cluster bandwidth wasteful mechanism to prevent unnecessary timeouts and retries for services requests in a switched fabric data network.

BRIEF DESCRIPTION OF THE DRAWINGS

A more complete appreciation of exemplary embodiments of the present invention, and many of the attendant advantages of the present invention, will become readily apparent as the same becomes better understood by reference to the following detailed description when considered in conjunction with the accompanying drawings in which like reference symbols indicate the same or similar components, wherein:

FIG. 1 illustrates a simple data network having several interconnected nodes for data communications according to an embodiment of the present invention;

FIG. 3 illustrates an example packet of data messages transmitted from a source node (data transmitter) to a destination node (data receiver) in an example data network according to an embodiment of the present invention;

DETAILED DESCRIPTION

Figure 2:
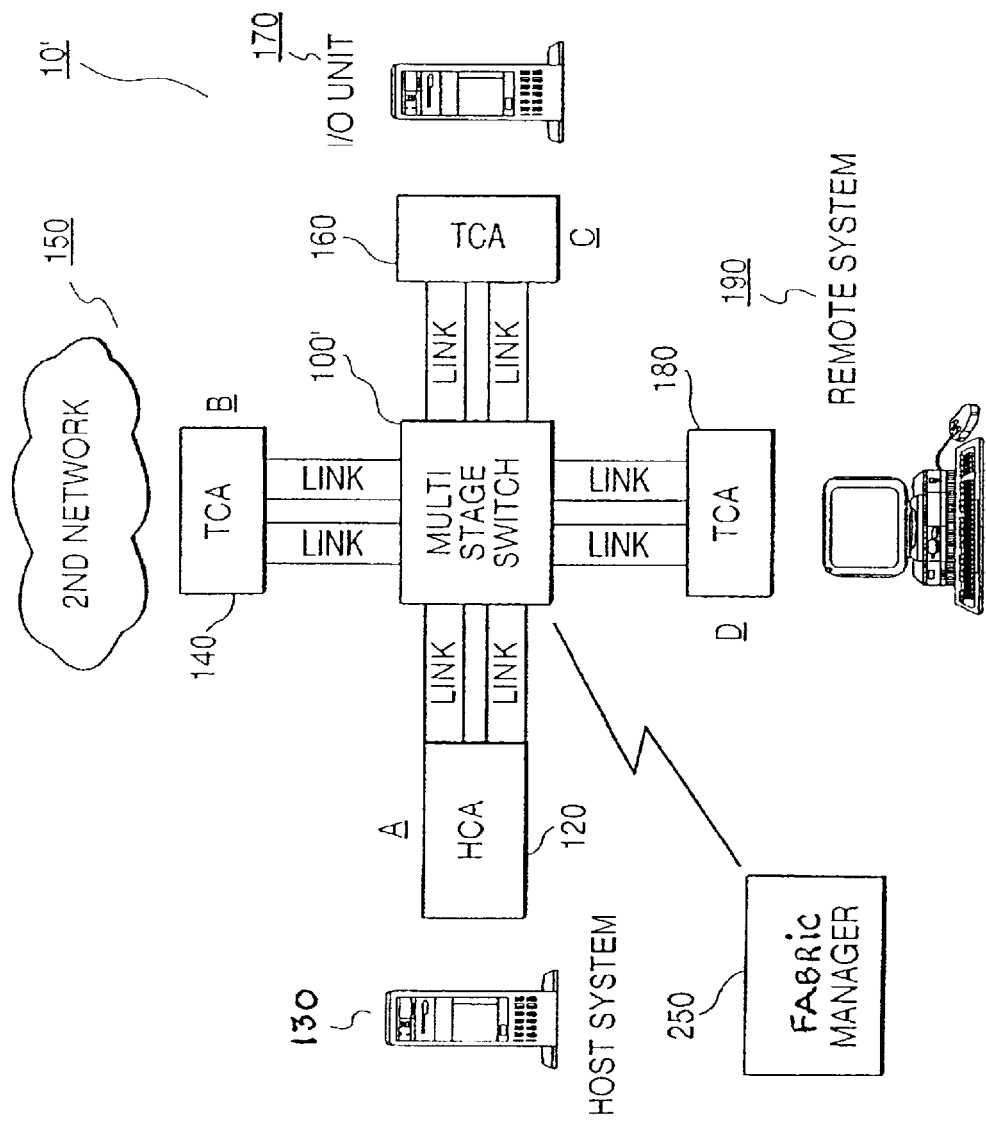
FIG. 2 illustrates another example data network having several nodes interconnected by corresponding links of a multi-stage switched fabric according to an embodiment of the present invention.

The present invention is applicable for use with all types of data networks, I/O hardware adapters and chipsets, including follow-on chip designs which link together end stations such as computers, servers, peripherals, storage subsystems, and communication devices for data communications. Examples of such data networks may include a local area network (LAN), a wide area network (WAN), a campus area network (CAN), a metropolitan area network (MAN), a global area network (GAN), a wireless personal area network (WPAN), and a system area network (SAN), including newly developed computer networks using Next Generation I/O (NGIO), Future I/O (FIO), InfiniBand™ and Server Net and those networks including channel-based, switched fabric architectures which may become available as computer technology advances to provide scalable performance. LAN systems may include Ethernet, FDDI (Fiber Distributed Data Interface) Token Ring LAN, Asynchronous Transfer Mode (ATM) LAN, Fiber Channel, and Wireless LAN. However, for the sake of simplicity, discussions will concentrate mainly on a host system including one or more hardware fabric adapters for providing physical links for channel connections in a simple data network having several example nodes (e.g., computers, servers and I/O units) interconnected by corresponding links and switches, although the scope of the present invention is not limited thereto.

Attention now is directed to the drawings and particularly to FIG. 1, in which a simple data network 10 having several interconnected nodes for data communications according to an embodiment of the present invention is illustrated. As shown in FIG. 1, the data network 10 may include, for example, one or more centralized switches 100 and four different nodes A, B, C, and D. Each node (endpoint) may correspond to one or more I/O units and host systems including computers and/or servers on which a variety of applications or services are provided. I/O unit may include one or more processors, memory, one or more I/O controllers and other local I/O resources connected thereto, and can range in complexity from a single I/O device such as a local area network (LAN) adapter to large memory rich RAID subsystem. Each I/O controller (IOC) provides an I/O service or I/O function, and may operate to control one or more I/O devices such as storage devices (e.g., hard disk drive and tape drive) locally or remotely via a local area network (LAN) or a wide area network (WAN), for example.

The centralized switch 100 may contain, for example, switch ports 0, 1, 2, and 3 each connected to a corresponding node of the four different nodes A, B, C, and D via a corresponding physical link 110, 112, 116, and 114. Each physical link may support a number of logical point-to-point channels. Each channel may be a bi-directional data path for allowing commands and data messages to flow between two connected nodes (e.g., host systems, switch/switch elements, and I/O units) within the network.

Each channel may refer to a single point-to-point connection where data may be transferred between end nodes (e.g., host systems and I/O units). The centralized switch 100 may also contain routing information using, for example, explicit routing and/or destination address routing for routing data from a source node (data transmitter) to a target node (data receiver) via corresponding link(s), and re-routing information for redundancy.

The specific number and configuration of end nodes (e.g., host systems and I/O units), switches and links shown in FIG. 1 is provided simply as an example data network. A wide variety of implementations and arrangements of a number of end nodes (e.g., host systems and I/O units), switches and links in all types of data networks may be possible.

According to an example embodiment or implementation, the end nodes (e.g., host systems and I/O units) of the example data network shown in FIG. 1 may be compatible with the "*Next Generation Input/Output (NGIO) Specification*" as set forth by the NGIO Forum on Jul. 20, 1999, and the "*InfiniBand™ Architecture Specification*" as set forth by the InfiniBand™ Trade Association on Oct. 24, 2000. According to the NGIO/InfiniBand™ Specification, the switch 100 may be an NGIO/InfiniBand™ switched fabric (e.g., collection of links, routers, switches and/or switch elements connecting a number of host systems and I/O units), and the end node may be a host system including one or more host channel adapters (HCAs), or a remote system such as an I/O unit including one or more target channel adapters (TCAs). Both the host channel adapter (HCA) and the target channel adapter (TCA) may be broadly considered as fabric (channel) adapters provided to interface end nodes to the NGIO/InfiniBand™ switched fabric, and may be implemented in compliance with "*Next Generation I/O Link Architecture Specification: HCA Specification, Revision 1.0*", and the "*InfiniBand™ Specification*" and the "*InfiniBand™ Link Specification*" for enabling the end nodes (endpoints) to communicate to each other over an NGIO/InfiniBand™ channel(s) with minimum data transfer rates, for example, up to 2.5 gigabit per second (Gbps).

For example, FIG. 2 illustrates an example data network (i.e., system area network SAN) 10' using an NGIO/InfiniBand™ Architecture to transfer message data from a source node to a destination node according to an embodiment of the present invention. As shown in FIG. 2, the data network 10' includes an NGIO/InfiniBand™ switched fabric 100' for allowing a host system and a remote system to communicate to a large number of other host systems and remote systems over one or more designated channels. Each host system may contain work queue formed in pairs in which service (work) requests are posted to describe data transfer operations (i.e., send/receive operations and remote direct memory access "RDMA" read/write operations) and location of data to be moved for processing and/or transportation over one or more designated channels via a switched fabric 100'. A channel connection is simply an abstraction that is established over a switched fabric 100' to allow work queue pairs (QPs) at source and destination end nodes (e.g., host and remote systems, and IO units that are connected to the switched fabric 100') to communicate to each other. Each channel can support one of several different connection semantics. Physically, a channel may be bound to a hardware port of a host system. Each channel may be acknowledged or unacknowledged. Acknowledged channels may provide reliable transmission of messages and data as well as information about errors detected at the remote end of the channel. Typically, a single channel between the host system and any one of the remote systems may be sufficient but data transfer spread between adjacent ports can decrease latency and increase bandwidth. Therefore, separate channels for separate control flow and data flow may be desired. For example, one channel may be created for sending request and reply messages. A separate channel or set of channels may be created for moving data between the host system and any one of the remote systems. In addition, any number of end nodes or end stations, switches and links may be used for relaying data in groups of packets between the end stations and switches via corresponding NGIO/InfiniBand™ links. A link can be a copper cable, an optical cable, or printed circuit wiring on a backplane used to interconnect switches, routers, repeaters and channel adapters (CAs) forming the NGIO/InfiniBand™ switched fabric 100'.

For example, node A may represent a host system 130 such as a host computer or a host server on which a variety of applications or services are provided. Similarly, node B may represent another network 150, including, but may not be limited to, local area network (LAN), wide area network (WAN), Ethernet, ATM and fibre channel network, that is connected via high speed serial links. Node C may represent an I/O unit 170, including one or more I/O controllers and I/O units connected thereto. Likewise, node D may represent a remote system 190 such as a target computer or a target server on which a variety of applications or services are provided. Alternatively, nodes A, B, C, and D may also represent individual switches of the NGIO/InfiniBand™ switched fabric 100' which serve as intermediate nodes between the host system 130 and the remote systems 150, 170 and 190.

Host channel adapter (HCA) 120 may be used to provide an interface between a memory controller (not shown) of the host system 130 (e.g., servers) and a switched fabric 100' via high speed serial NGIO/InfiniBand™ links. Similarly, target channel adapters (TCA) 140 and 160 may be used to provide an interface between the multi-stage switched fabric 100' and an I/O controller (e.g., storage and networking devices) of either a second network 150 or an I/O unit 170 via high speed serial NGIO/InfiniBand™ links. Separately, another target channel adapter (TCA) 180 may be used to provide an interface between a memory controller (not shown) of the remote system 190 and the switched fabric 100' via high speed serial NGIO/InfiniBand™ links. Both the host channel adapter (HCA) and the target channel adapter (TCA) may be broadly considered as channel adapters (CAs) (also known as fabric adapters) provided to interface either the host system 130 or any one of the remote systems 150, 170 and 190 to the switched fabric 100', and may be implemented in compliance with "*Next Generation I/O Link Architecture Specification: HCA Specification, Revision* 1.0" and the "*InfiniBand™ Architecture Specification*" for enabling the end nodes (endpoints) to communicate on one or more an NGIO/InfiniBand™ link(s). Individual channel adapters (CAs) and switches may have one or more connection points known as ports for establishing one or more connection links between end nodes (e.g., host systems and I/O units).

The multi-stage switched fabric 100' may include one or more subnets interconnected by routers in which each subnet is composed of switches, routers and end nodes (such as host systems or I/O subsystems). In addition, the multi-stage switched fabric 100' may include a fabric manager 250 connected to all the switches for managing all network management functions. However, the fabric manager 250 may alternatively be incorporated as part of either the host system 130, the second network 150, the I/O unit 170, or the remote system 190 for managing all network management functions.

If the multi-stage switched fabric 100' represents a single subnet of switches, routers and end nodes (such as host systems or I/O subsystems) as shown in FIG. 2, then the fabric manager 250 may alternatively be known as a subnet manager "SM". The fabric manager 250 may reside on a port of a switch, a router, or a channel adapter (CA) of an end node and can be implemented either in hardware or software. When there are multiple subnet managers "SMs" on a subnet, one subnet manager "SM" may serve as a master SM. The remaining subnet managers "SMs" may serve as standby SMs. The master SM may be responsible for (1) learning or discovering fabric (network) topology; (2) assigning unique addresses known as Local Identifiers (LID) to all ports that are connected to the subnet; (3) establishing all possible data paths among end nodes, via switch forwarding tables (forwarding database); and (4) detecting and managing faults or link failures in the network and performing other network management functions. However, NGIO/InfiniBand™ is merely one example embodiment or implementation of the present invention, and the invention is not limited thereto. Rather, the present invention may be applicable to a wide variety of any number of data networks, hosts and I/O units using industry specifications. For example, practice of the invention may also be made with Future Input/Output (FIO). FIO specifications have not yet been released, owing to subsequent merger agreement of NGIO and FIO factions combine efforts on InfiniBand™ Architecture specifications as set forth by the InfiniBand Trade Association (formed Aug. 27, 1999) having an Internet address of "http://www.InfiniBandta.org."

FIG. 3 illustrates an example packet format of message data transmitted from a source node (data transmitter) to a destination node (data receiver) through switches and/or intermediate nodes in an example IBA subnet according to the "*InfiniBand™ Architecture Specification*" as set forth by the InfiniBand™ Trade Association on Oct. 24, 2000. As shown in FIG. 3, a message data 300 may represent a sequence of one or more data packets 310 (typically derived from data transfer size defined by a work request). Each packet 310 may include header information 312, variable format packet payload 314 and cyclic redundancy check (CRC) information 316. Under the "*Next Generation Input/Output (NGIO) Specification*" as previously set forth by the NGIO Forum on Jul. 20, 1999, the same data packets may be referred to as data cells having similar header information as the least common denominator (LCD) of message data. However, NGIO header information may be less inclusive than InfiniBand™ header information. Nevertheless, for purposes of this disclosure, data packets are described herein below via InfiniBand™ protocols but are also interchangeable with data cells via NGIO protocols.

The header information 312 according to the InfiniBand™ specification may include, for example, a local routing header, a global routing header, a base transport header and extended transport headers each of which contains functions as specified pursuant to the "*InfiniBand™ Architecture Specification*". For example, the local routing header may contain fields such as a destination local identifier (LID) field used to identify the destination port and data path in the data network 10', and a source local identifier (LID) field used to identify the source port (injection point) used for local routing by switches within the example data network 10' shown in FIG. 2.

Figure 4:
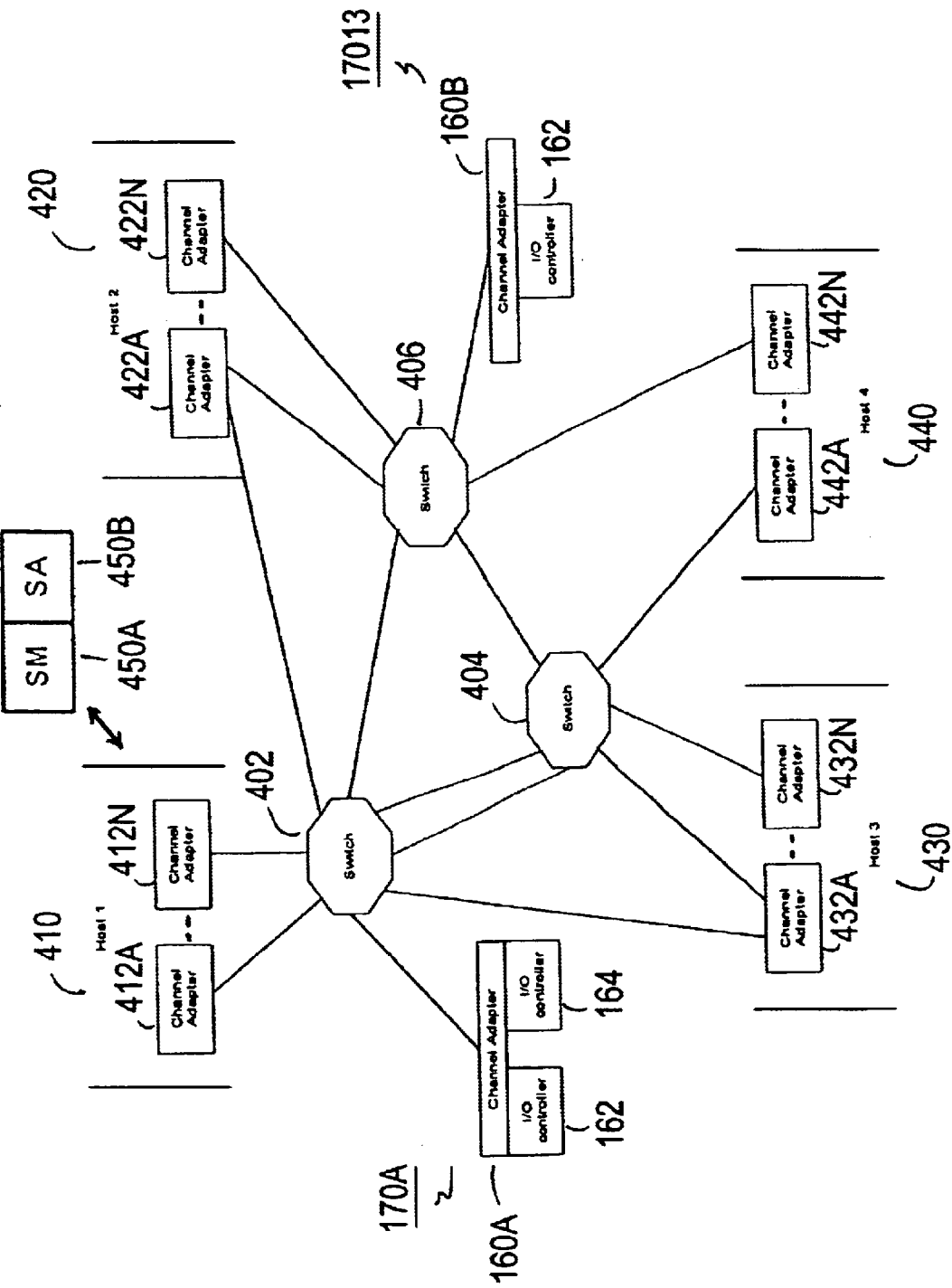
FIG. 4 illustrates an example InfiniBand™ Architecture (IBA) subnet including switches and channel adapters installed, for example, at respective host system and remote system according to an embodiment of the present invention.

FIG. 4 illustrates an example InfiniBand™ Architecture (IBA) subnet in an InfiniBand™ cluster including, for example, four (4) host systems including a plurality of channel adapters (CAs) 410, 420, 430 and 440, three (3) switches 402, 404 and 406, and two I/O enclosures 170A–170B with channel adapters (CAs) 160A–160B according to an embodiment of the present invention. Each of the host systems 410, 420, 430 and 440 and the I/O enclosures 170A–170B may serve as an individual service provider or an individual InfiniBand™ client requesting services from the service provider in a client/server model, for example. One or more channel adapters (CAs) may be installed at each host system 410, 420, 430 and 440.

The IBA subnet 400 may also include a collection of switch (S1) 402, switch (S2) 404, and switch (S3) 406 arranged to establish connection between the host systems 410, 420, 430 and 440, via respective channel adapters (CAs) 412A–412N, 422A–422N, 432A–432N and 442–442N and I/O enclosures 160A–160B, via respective channel adapters (CAs) 160A–160B. Each switch as well as the channel adapter (CA) may have one or more connection points called "ports" provided to establish connection with every other switch and channel adapter (CA) in an example IBA subnet 400 via one or more link.

Typically IBA management services may be provided by a local subnet manager "SM" 450A and a local subnet administrator "SA" 450B. The subnet manager "SM" 450A and the subnet administrator "SA" 450B may substitute the fabric manager 250 shown in FIG. 2, and can be implemented either in hardware or software module (i.e., an application program) installed to provide IBA management services for all switches and end nodes in the IBA subnet 400. For example, if the subnet manager "SM" 450A is implemented in software, a subnet management software module may be written using high-level programming languages such as C, C++ and Visual Basic, and may be provided on a computer tangible medium, such as memory devices; magnetic disks (fixed, floppy, and removable); other magnetic media such as magnetic tapes; optical media such as CD-ROM disks, or via Internet downloads, which may be available for a human subnet (fabric) administrator to conveniently plug-in or download into an existing operating system (OS). Alternatively, the software module may also be bundled with the existing operating system (OS) which may be activated by a particular device driver for performing all network management functions in compliance with the InfiniBand™ Architecture specification.

In one embodiment of the present invention, both the subnet manager "SM" 450A and the subnet administrator "SA" 450B may be installed at any one of the host systems 410, 420, 430 and 440 for managing all subnet management functions. However, the subnet manager "SM" 450A and the subnet administrator "SA" 450B may also be installed as part of any individual end node and switch within the IBA subnet 400.

The management services may be broadly classified into subnet services and general services. At a minimum the subnet services, offered by the subnet manager "SM" 450A, include discovering fabric topology, assigning unique addresses called Local Identifiers (LID) to all ports that are connected to the IBA subnet 400, programming switch forwarding tables (also known as routing table) and maintaining general functioning of the IBA subnet 400. Most of the data collected during discovery and used to configure the IBA subnet 400 may be assimilated by the subnet administrator "SA" 450B for providing access to information such as data paths and alternate data paths between end nodes, topology change notifications and notification of events, including error detection, and recovery procedures.

In addition, particular cluster implementations may also need and contain proprietary services to perform cluster-specific functions. For example, specific cluster implementations may contain a Name Service that maps host system names to InfiniBand™ information such as Local Identifiers (LIDs), Global Identifiers (GIDs), Globally Unique Identifiers (GUIDs) etc. All these services are implemented as logically independent entities, i.e., end nodes such as host systems, often known as service providers (service class managers). Some services (e.g. subnet administration service) are typically invoked very frequently and by multiple clients simultaneously. Most communication between InfiniBand™ service providers (service class managers) and clients is done using Unreliable Datagram (UD) queue pairs (QPs). For such queue pairs (QPs), no reliability guarantees are provided and service request or response messages can get lost in the IBA subnet 400. In this situation, when a UD client does not receive a response for a service request within a certain amount of time, the client simply resubmits the service request to the service provider.

As described below, the InfiniBand™ Architecture specification provides some basic mechanisms for clients to determine how long they should wait for a response before timing out and generating retries. In order to compute how long an InfiniBand™ client should wait before timing out on a service request, the client needs to factor in the following propagation and processing times:

1) Propagation time through intervening switches and links for a request message to propagate from the client (e.g., one host system) to the service provider (e.g., another host system) and for the response message to propagate back from the service provider to the client. In the InfiniBand™ Architecture specification, this time may be represented by a SubnetTimeout value. The SubnetTimeout value may be programmed or computed for each port by the subnet manager (SM) 450A, and may represent a one-way propagation time from the client (e.g., one host system) to the service provider (e.g., another host system) in the IBA subnet 400. The SubnetTimeout value can be multiplied by two (2) to compute the round trip propagation time through the IBA subnet 400 from the client to the service provider and back.

2) Time required for a request message to be delivered to the service provider software once the channel adapter (CA) on which the service provider is running receives the same request message. This includes the amount of time the receiving channel adapter (CA) takes to generate a physical interrupt to get software attention and the amount of time required for an operating system (OS) and other lower level software to process the incoming message before it is delivered to the intended recipient service provider. In the InfiniBand™ Architecture specification, there is no way in which a client can determine this time to factor into its timeout value.

3) Once the service request is handed to the service provider software (i.e., subnet administrator "SA" 450B), a certain amount of time is required to process the service request and generate the response. This processing time includes the times the service request spends in a service queue waiting for other preceding service requests to be processed before the same service request can be processed. The processing time also includes the time to actually process this request—for example to read a database on disk to process the request. In the InfiniBand™ Architecture specification, the processing time may be represented by a RespTimeValue which is set by a service provider and reported to the client upon request by the client in a form of a GetResp(ClassPortInfo) message.

In short, the InfiniBand™ Architecture specification provides SubnetTimeout and RespTimeValue values for a client of UD QPs to calculate how long it should wait for a response to its service request before timing out and retrying with a new service request. However, there are two major problems with the basic infrastructure provided in the InfiniBand™ Architecture specification.

First, there is no way to factor in some delays that contribute to the amount of time an InfiniBand™ client should wait before timing out and retrying a service request. For example, there is no way in which a client can determine or attempt to factor in the amount of time required for the message to be delivered from the receiving channel adapter (CA) to the service provider software. Assuming a zero value for this time may lead to a timeout that is too small and leads to unnecessary timeouts and retries.

Second, values used by InfiniBand™ clients to determine timeouts are programmed statically and cannot take into account dynamic variation as a result of fabric congestion or temporary overload of specific service providers. For example, a SubnetTimeout value may be calculated and programmed by the subnet manager (SM) 450A at initial fabric power-up time where there is almost no client traffic on the IBA subnet 400. During this initial power-up time, there is virtually no switch contention and therefore subnet propagation delays are small. In a run-time environment, the subnet propagation delay may be significantly more than the value computed at fabric initialization time. In the same way, service providers (service class managers) typically compute and provide values for RespTimeValue just once, when a client initially discovers the service provider and queries this value. As the load on the service provider increases, the amount of time required by the service provider to service a service request from a client can increase significantly. However, there is no way to feed this information back to the existing client using the service provider in the InfiniBand™ Architecture specification.

As a result of the problems mentioned above, there is a negative cascading effect when an IBA subnet 400 is congested for example, or when a service provider gets overloaded. In this situation, clients are using timeout values that are too small. As a result, the clients may time out too soon and issue unnecessary retries to the service provider. A service provider typically does not (and cannot) distinguish between valid first-time service requests and redundant retries generated as a result of clients timing out too soon. The service provider is then forced to service multiple identical requests from the clients, thus artificially increasing the load of the service provider further and leading to a vicious cycle of even more timeouts and retries.

In order to address the delays and the dynamic variations as a result of fabric congestion or temporary overload of specific service providers, a feedback loop that throttles new service requests from clients may advantageously be created to adjust the timeout values clients use so that there are fewer unnecessary timeouts and retries as the workload on the service provider (class manager) increases. An especially designed dynamic workload feedback mechanism may be incorporated into a service provider (class manager) to provide dynamic feedback to its clients as its load level changes. According to an embodiment of the present invention, the dynamic workload feedback mechanism may contain an algorithm executed by a service provider when a new service request is received from a client for queue in a pending service queue, and another algorithm executed by the service provider when picking up service requests from the pending service queue for processing. As a result, a service provider can dynamically change expectations of the clients about how much time required to process a service request under current subnet conditions so that the clients will not have to time out too soon and generate redundant retries. These algorithms may be software written using high-level programming languages such as C, C++ and Visual Basic, and may be provided on a computer tangible medium, such as memory devices; magnetic disks (fixed, floppy, and removable); other magnetic media such as magnetic tapes; optical media such as CD-ROM disks, or via Internet downloads, which may be available for a human administrator to conveniently plug-in or download into an existing operating system (OS) of a service provider. Alternatively, the software module may also be bundled with the existing operating system (OS) which may be activated when a new service request is received from a client and when an individual service request from the head of a pending service queue is picked up for processing in compliance with the InfiniBand™ Architecture specification.

Service requests from clients come in on the InfiniBand™ Queue Pair (QP) on which the service provider (class manager) is listening. Each service request may be redirected to a different address and QP at any time using the ClassPortInfo management datagram (MAD) according to the InfiniBand™ Architecture specification. Each service provider (service class manager) may be required to implement a GetResp(ClassPortInfo) message that returns all the information needed by a client to issue service requests to the service provider (service class manager). One piece of information that is included in this message may include a RespTimeValue, which represents the amount of time the class manager expects to take to respond to service requests. The InfiniBand™ Architecture specification imposes no requirements or restrictions about when a GetResp (ClassPortInfo) can be issued. A typical service provider (service class manager) may not issue a GetResp (ClassPortInfo) to clients at all (e.g. if it does not redirect from QP1 to a different QP). Usually a service provider (service class manager) may issue a single GetResp (ClassPortInfo) and redirect a client only once within a client's lifetime.

According to an embodiment of the present invention, a service provider (class manager) may be configured to track its current workload and issue GetResp(ClassPortInfo) messages to its clients when its workload exceeds or falls below certain levels. The primary purpose of issuing the GetResp (ClassPortInfo) messages in this case is to provide a new value for RespTimeValue and not to redirect the client to a different queue pair (QP) or Local Identifier (LID). If the workload exceeds a certain level, the service provider may set a flag that indicates that no new service requests will be accepted for processing. However, instead of silently dropping new incoming service requests from clients as previously expected, the service provider may respond with a GetResp(ClassPortInfo) message that contains a larger RespTimeValue. In this way, new as well as existing clients may obtain feedback from the service provider that indicates that the service provider is getting overloaded and needs more time to process service requests from clients. Clients are then capable and responsible for increasing their timeout value and thus wait longer before timing out and issuing unnecessary duplicate requests.

In a similar fashion, if the workload decreases below a certain level, the service provider can choose to set a flag that indicates that the service provider may respond to new requests with a GetResp(ClassPortInfo) message that contains a smaller RespTimeValue. In this way, new as well as existing clients that are using a larger value of RespTimeValue can start using the smaller value for timeouts.

For example, if a typical RespTimeValue is 50 milliseconds (ms) for the service provider to process a service request, then the RespTimeValue included in the GetResp (ClassPortInfo) message transmitted from the service provider back to the client may be made larger or smaller than 5 ns, typically by a known constant multiplier value. This way the client can be made aware if the service provider is overloaded and needs more or less time to process service requests pending in the service queue 500. The client may then be responsible for increasing or decreasing timeout values and thus wait longer or shorter before timing out and issuing unnecessary duplicate service requests.

Figure 5:
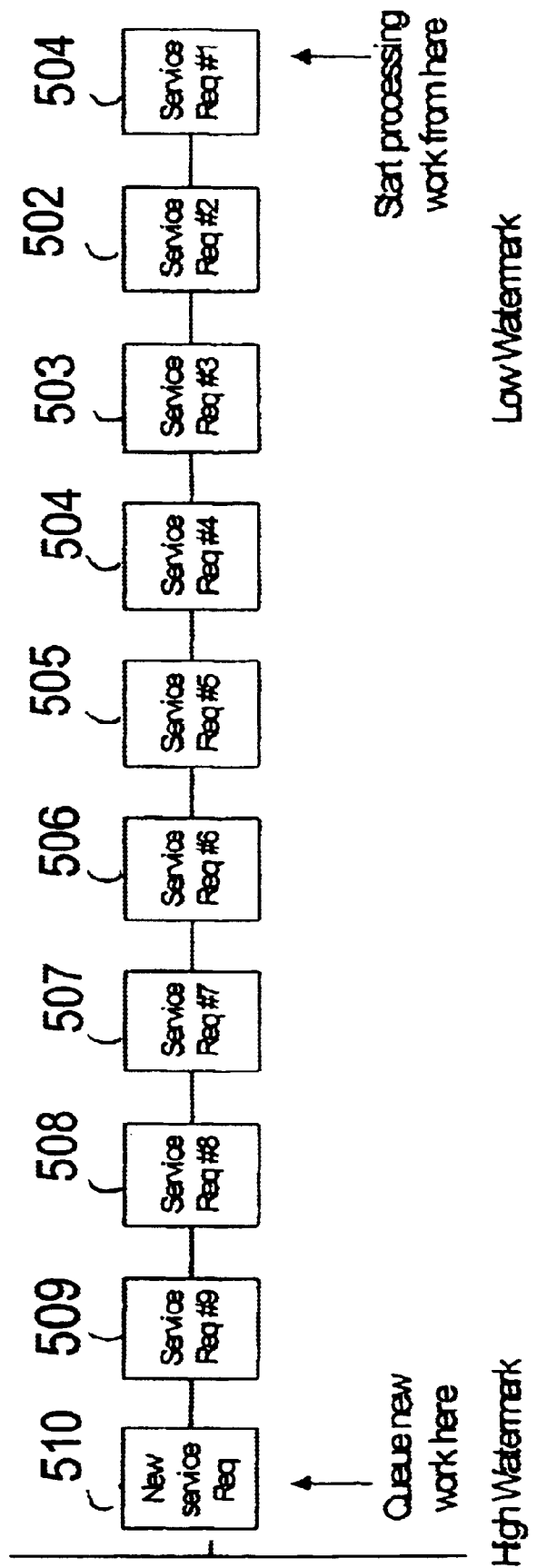
FIG. 5 illustrates a sample work queue (WQ) at a service provider according to an embodiment of the present invention.

FIG. 5 illustrates a sample service (work) queue of pending service requests from individual InfiniBand™ client at a service provider according to an embodiment of the present invention. The service provider and individual InfiniBand™ client may correspond to, but not limited thereto, any one of the host systems 410, 420, 430 and 440 and the I/O enclosures 170A–170B in an IBA subnet 400 as described with reference to FIG. 4. For example, the service provider may correspond to the host system 410, and the InfiniBand™ client may correspond to any one of host systems 420, 430 and 440 and the I/O enclosures 170A–170B. As shown in FIG. 5, the service provider 410 may maintain a high watermark and a low watermark for its service queue 500, for example, starting from service request #1 501, service request #2 502, service request #3 503, service request #4 504, service request #5 505, service request #6 506, service request #7 507, service request #8 508, service request #9 509 and the latest new service request 510. One or more service requests 501–510 may come from a different end node or multiple end nodes such as different host systems 410, 420, 430 and 440 and the I/O enclosures 170A–170B as described with reference to FIG. 4. Crossing these high and low watermarks in specific directions may cause the service provider 410 to take specific actions, when service requests from clients such as service request #1 501 to new service request 510 are received in the service (work) queue 500.

Figure 6:
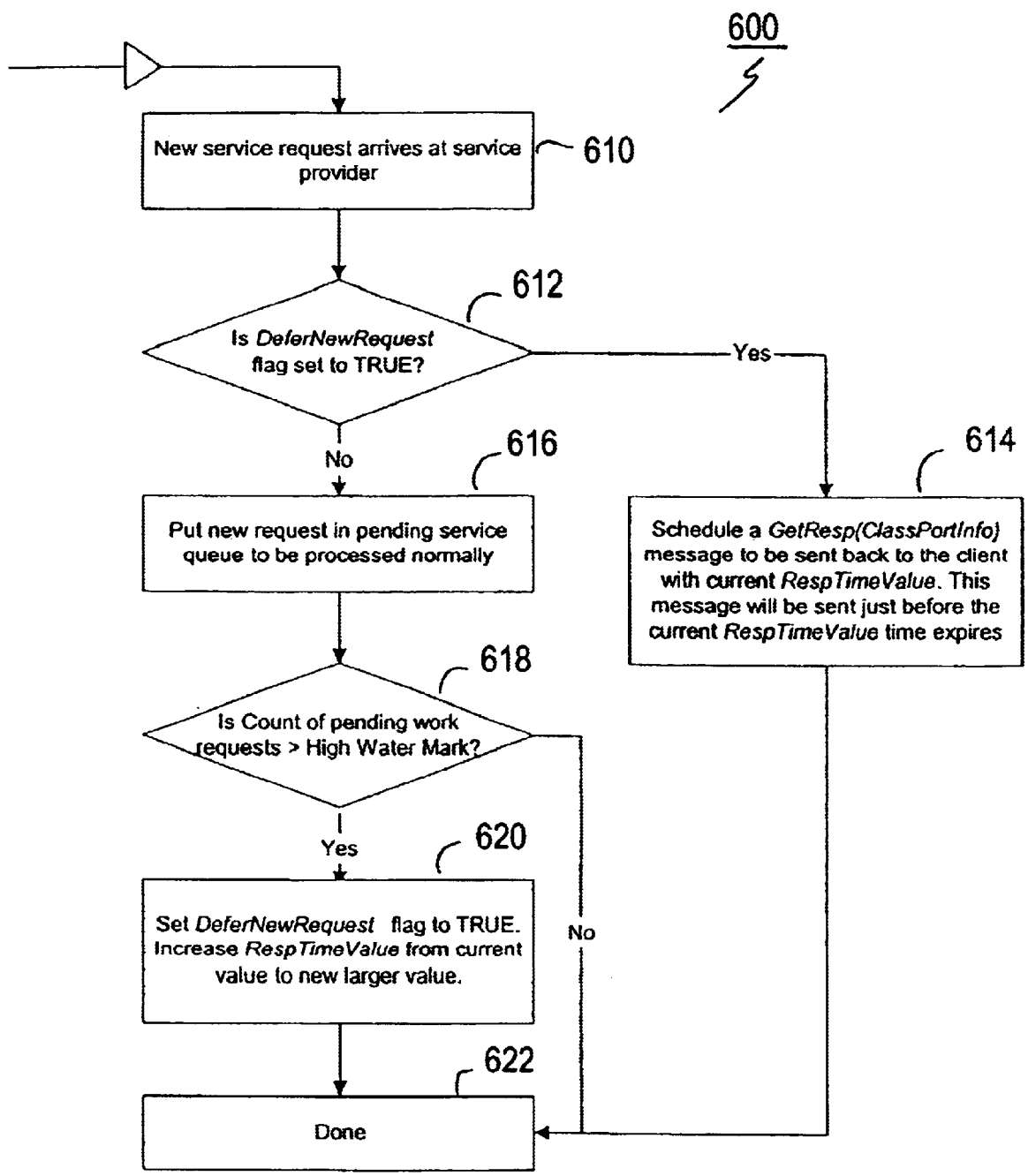
FIG. 6 illustrates an example high-level flow control algorithm executed by a service provider when a new service request is received from a client in an example IBA subnet according to an embodiment of the present invention.

For example, FIG. 6 illustrates an example algorithm 600 executed by a service provider 410 when an incoming service request is received from a client in an IBA subnet according to an embodiment of the present invention. As shown in FIG. 6, when an incoming service request from a client arrives at a service provider 410 at block 610, the service provider 410 checks if it is in an overload state (i.e., depth of pending service requests is greater than the high watermark). In other words, the service provider 410 checks if a DeferNewRequest flag is set to TRUE at block 612.

If the service provider 410 is in an overload state, that is if a DeferNewRequest flag is set to TRUE at block 612, the service provider 410 simply schedules a GetResp(ClassPortInfo) message to be sent with the current value of RespTimeValue that corresponds to the overload state of the service provider 410 at block 614. This service request may not be posted in the pending service queue 500. Rather, the GetResp(ClassPortInfo) response message may be sent just before the timeout indicated by the RespTimeValue occurs.

If the service provider 410 is not in an overload state, that is if a DeferNewRequest flag is set to FALSE at block 612 (i.e., depth of pending service requests is not greater than the high watermark), the service provider 410 accepts the incoming service request in the pending service queue 500 for processing at block 616. Then the service provider 410 checks again to determine if the new service request received at the pending service queue 500 made the pending service queue 500 go over the high watermark (i.e. this incoming service request caused the overloading of the service provider) at block 618.

If the new service request received at the pending service queue 500 made the pending service queue 500 go over the high watermark at block 618, the service provider 410 computes a new larger value for RespTimeValue and marks the DeferNewRequest flag so that the next incoming service request will be refused for processing at block 620. The service provider 410 may then terminate the algorithm 600 and remain waiting for a next incoming service request.

However, if the new service request received at the pending service queue 500 does not make the pending service queue 500 go over the high watermark, the service provider 410 may terminate the algorithm 600 at block 622 and proceed to process the service request from the client as normal.

As usual there may be some variations to the procedure described with reference to FIG. 6. For example, instead of scheduling one for a future time, a service provider 410 may choose to send a GetResp(ClassPortInfo) message immediately after a new service request is received in the pending service queue 500 while the service provider 410 in the overload state.

Figure 7:
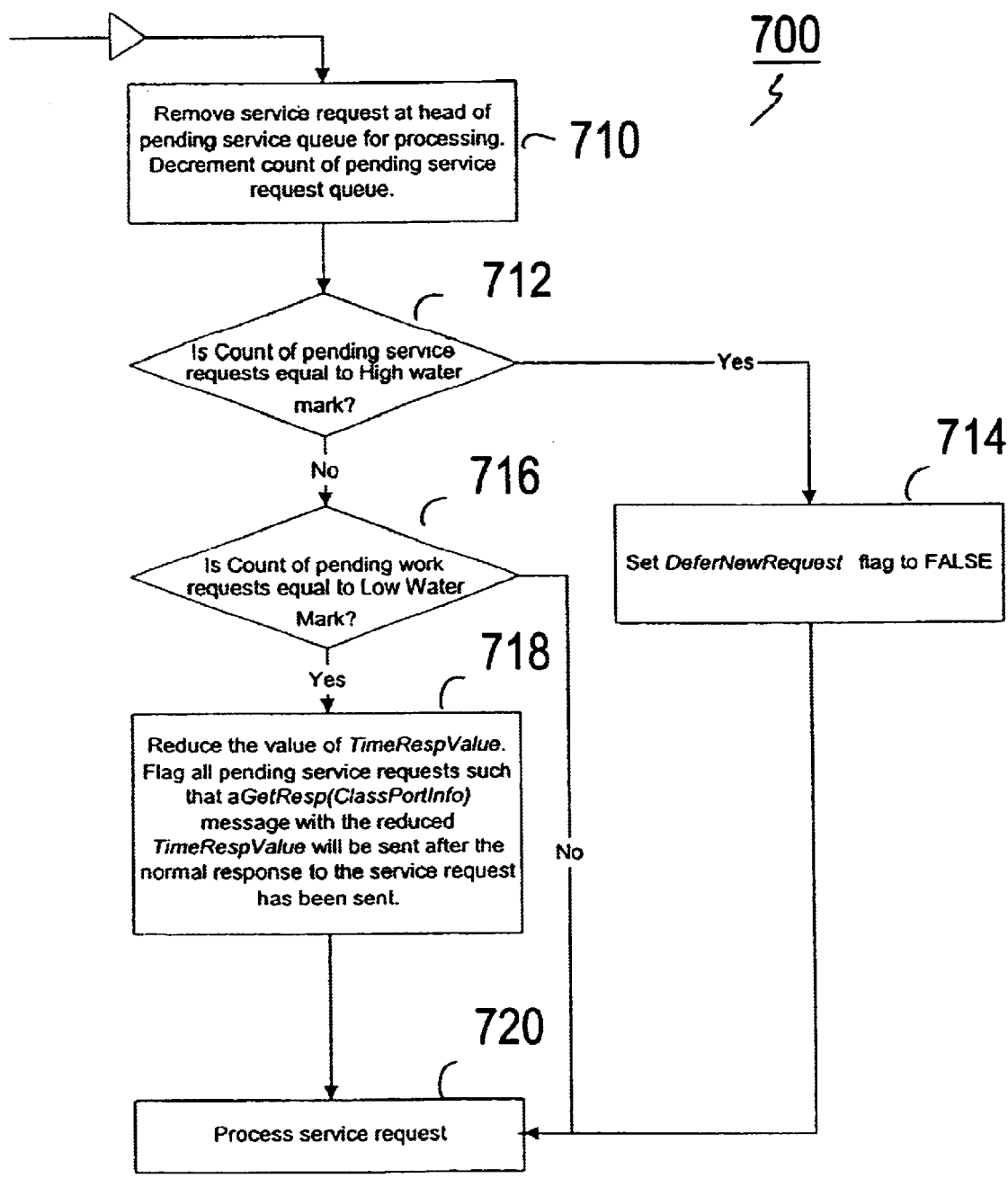
FIG. 7 illustrates an example high-level flow control algorithm executed by a service provider when picking up service requests from the head of a service queue for processing in an example IBA subnet according to an embodiment of the present invention.

FIG. 7 illustrates an example algorithm 700 executed by a service provider when a new service request received from a client is picked up from the head of a service queue 500 for processing in an example IBA subnet 400 according to an embodiment of the present invention. As shown in FIG. 7, a service provider 410 removes a service request at the head of the service queue 500 for processing and decrements a count of pending service requests at the service queue 500 at block 710. Next the service provider 410 checks the pending service queue 500 to determine if servicing a new service request takes it from an overload state to a normal state or if a count of pending service requests at the service queue 500 equal to high watermark at block 712.

If servicing a new service request takes the service provider 410 from an overload state to a normal state, that is, if a count of pending service requests at the pending service queue 500 equal to the high watermark at block 712, the service provider 410 clears the DeferNewRequest flag that causes future service requests to be rejected for processing or sets the DeferNewRequest flag to FALSE that allows all future service requests to be processed at block 714.

If a count of pending service requests at the pending service queue 500 is not equal to high watermark at block 712, the service provider 410 then checks to determine if picking up this service request causes the count of pending service requests at the pending service queue 500 to go below the low watermark that indicates it is virtually idle and can handle client requests at a faster pace at block 716.

If the count of pending service requests at the pending service queue 500 equal to the low watermark, the service provider 410 reduces the value of RespTimeValue and flags all pending service request responses to be followed by a GetResp(ClassPortInfo) message with a smaller value of RespTimeValue at block 718. This procedure advantageously allows the service provider 410 to permit InfiniBand™ clients to generate service requests at a faster rate and to inform some existing clients that the service provider 410 has moved to a virtually idle state. Then the service provider 410 may process the service request at block 720.

Several variations to the procedure described with reference to FIG. 7 may be available. For example, the service provider 410 may continue to send a GetResp(ClassPortInfo) message with a smaller value of RespTimeValue to all client service requests till the depth of the pending service queue 500 builds up to some predetermined level. This allows the service provider 410 to reach more InfiniBand™ clients and inform the clients that the service provider 410 is in a virtually idle state, while allowing more clients to become aware of the smaller RespTimeValue value. In addition, the high watermark used in the algorithm shown in FIG. 7 has to be set to a value lower than the number of InfiniBand™ work requests that are posted to the channel adapter (CA) by the service provider 410 to accept incoming messages. This is to ensure that InfiniBand ™ work requests are available at the channel adapter (CA) so that incoming client service request messages can be accepted even when the service provider 410 is in an overload state (i.e. depth of pending service requests is greater than the high watermark). This allows the service provider 410 to respond with a GetResp(ClassPortInfo) instead of silently dropping service requests that arrive while the service provider 410 is in the overload state.

As described from the foregoing, the present invention advantageously provides a dynamic workload feedback mechanism that allows the service provider to provide dynamic feedback to its clients as its workload changes so that the clients will know the time required by the service provider to process a service request under current subnet conditions in order to avoid timeouts too soon and generate redundant retries which can artificially increase the workload of the service provider in turn causing even more timeouts and retries and ultimately complete failure of a service provider to handle service requests. With a service provider overloaded with handling retries, clients may see erratic behavior. For example, it is possible that a client is able to successfully get service request responses for a while and then suddenly get repeated timeouts due to transient overloading of the service provider. If a client times out a set number of times, the service provider may give and be forced to stop completely. Using the dynamic workload feedback mechanism according to an embodiment of the present invention, the client may at least get GetResp (ClassPortInfo) messages from the service provider if it is not able to process the actual service requests. This may inform the client that the service provider is overloaded but active. With the service provider proving that it is still active and sending back a larger value of RespTimeValue to use for timeouts, clients can set their expectations accordingly. As a result, InfiniBand clusters are more usable, client friendly and less wastefully congested. These properties assist in achieving the end result of a functional and high performance cluster and promote the use of clusters based on NGIO/InfiniBand™ technology.

While there have been illustrated and described what are considered to be exemplary embodiments of the present invention, it will be understood by those skilled in the art and as technology develops that various changes and modifications may be made, and equivalents may be substituted for elements thereof without departing from the true scope of the present invention. For example, the data network as shown in FIGS. 1–4 may be configured differently or employ some or different components than those illustrated. Such a data network may include a local area network (LAN), a wide area network (WAN), a campus area network (CAN), a metropolitan area network (MAN), a global area network (GAN) and a system area network (SAN), including newly developed computer networks using Next Generation I/O (NGIO) and Future I/O (FIO) and Server Net and those networks which may become available as computer technology advances in the future. LAN system may include Ethernet, FDDI (Fiber Distributed Data Interface) Token Ring LAN, Asynchronous Transfer Mode (ATM) LAN, Fiber Channel, and Wireless LAN. However, the mechanism shown in FIGS. 5–7 for preventing unnecessary timeouts and retries for service requests in those clusters may need to be adjusted accordingly. In addition, the subnet manager "SM" and the subnet administrator "SA" may be integrated and installed at any node of the IBA subnet. Moreover, the mechanism shown in FIGS. 6–7 may be configured differently or employ some or different components than those illustrated without changing the basic function of the invention. Furthermore, storage devices suitable for tangibly embodying computer program instructions include all forms of non-volatile memory including, but not limited to: semiconductor memory devices such as EPROM, EEPROM, and flash devices; magnetic disks (fixed, floppy, and removable); other magnetic media such as tape; and optical media such as CD-ROM disks. Many modifications may be made to adapt the teachings of the present invention to a particular situation without departing from the scope thereof. Therefore, it is intended that the present invention not be limited to the various exemplary embodiments disclosed, but that the present invention includes all embodiments falling within the scope of the appended claims.

What is claimed is:

1. A method for providing dynamic feedback about a workload of a service provider in a switched fabric, comprising:

receiving an incoming service request from a client, via said switched fabric;

determining a current workload of the service provider; and sending a response message based on the current workload of the service provider to the client, via said switched fabric, including information needed by the client to issue future service requests to prevent unnecessary timeouts and retries of duplicate service requests.

2. The method as claimed in claim 1, wherein the information included in the response message contains a response time value (RespTimeValue) indicating the amount of time the service provider expects to respond to the incoming service request based on the workload of the service provider.

3. The method as claimed in claim 2, wherein the current workload indicates a number of service requests pending in a service queue of the service provider to be processed by the service provider.

4. The method as claimed in claim 2, wherein, when the current workload exceeds a certain level, the service provider sets a flag indicating that no new service requests will be accepted for processing, and generates the response message including a larger response time value (RespTimeValue) to inform the client that the service provider is overloaded and needs more time to process service requests.

5. The method as claimed in claim 2, wherein, when the current workload falls below a certain level, the service provider sets a flag indicating that it is lightly loaded, and generates the response message including a smaller response time value (RespTimeValue) to inform the client that the service provider is not overloaded and needs less time to process service requests.

6. The method as claimed in claim 1, wherein the client and the service provider correspond to a respective end node of said switched fabric having one or more channel adapters installed to support one or more ports for data communication via physical links of said switched fabric.

7. The method as claimed in claim 1, wherein, when determining the current workload of the service provider, the service provider performs:

checking if a DeferNewRequest flag is set to TRUE indicating that the service provider is overloaded;

if the DeferNewRequest flag is set to TRUE, scheduling and sending the response message to the client, including a response time value (RespTimeValue) that corresponds to an overload state of the service provider;

if the DeferNewRequest flag is set to FALSE, accepting the incoming service request from the client in a service queue for processing;

determining if the incoming service request posted at the service queue makes the service queue to go over a high watermark;

if the incoming service request posted at the service queue makes the service queue to go over the high watermark, computing a larger value for RespTimeValue, setting the DeferNewRequest flag to TRUE, and proceeding to process the incoming service request posted at the service queue; and if the incoming service request posted at the service queue does not make the service queue to go over the high watermark, proceeding to process the incoming service request posted at the service queue.

8. The method as claimed in claim 7, wherein the service provider picks up service requests to process by:

removing a service request at the head of the service queue for processing and decrementing a count of pending service requests at the service queue;

determining if a count of pending service requests equals to a high watermark indicating an overload state;

if a count of pending service requests at the service queue equals to the high watermark, setting the DeferNewRequest flag to FALSE to allow all future service requests to be processed, and proceeding to process the incoming service request posted at the service queue;

if a count of pending service requests at the pending service queue is not equal to the high watermark, determining if a count of pending service equals to a low watermark indicating a virtually idle state;

if the count of pending service requests equals to the low watermark, computing a smaller value for RespTimeValue and proceeding to process the incoming service request posted at the service queue; and if the count of pending service requests is not equal to the low watermark, proceeding to process the incoming service request posted at the service queue.

9. The method as claimed in claim 8, wherein the client is further configured to increase or decrease timeout values to prevent unnecessary timeouts and retries of duplicate service requests.

10. The method as claimed in claim 1, wherein the client and the service provider are configured in accordance with the "*InfiniBand™ Architecture Specification*".

11. A data network, comprising:

a service provider having at least one channel adapter (CA) installed therein supporting one or more ports;

at least one client having at least one channel adapter (CA) installed therein supporting one or more ports; and a switched fabric comprising a plurality of different switches which interconnect the service provider via CA ports to the client via CA port along different physical links for data communications, wherein the service provider further includes a dynamic workload feedback mechanism configured to provide dynamic feedback to the client about a workload of the service provider for preventing unnecessary timeouts and retries of duplicate service requests.

12. The data network as claimed in claim 11, wherein the dynamic workload feedback mechanism is configured to determine a current workload of the service provider upon receipt of an incoming service request from a client, via said switched fabric; and send a response message based on the current workload of the service provider to the client, via said switched fabric, including information needed by the client to issue future service requests to prevent unnecessary timeouts and retries of duplicate service requests.

13. The data network as claimed in claim 12, wherein the information included in the response message contains a response time value (RespTimeValue) indicating the amount of time the service provider expects to respond to the incoming service request based on the workload of the service provider.

14. The data network as claimed in claim 12, wherein the current workload indicates a number of service requests pending in a service queue of the service provider to be processed by the service provider.

15. The data network as claimed in claim 13, wherein, when the current workload falls below a certain level, the service provider sets a flag indicating it is lightly loaded, and generates the response message including a smaller response time value (RespTimeValue) to inform the client that the service provider is not overloaded and needs less time to process service requests.

16. The data network as claimed in claim 13, wherein, when the current workload exceeds a certain level, the service provider sets a flag indicating that no new service requests be accepted for processing, and generates the response message including a larger response time value (RespTimeValue) to inform the client that the service provider is overloaded and needs more time to process service requests.

17. The data network as claimed in claim 12, wherein the dynamic workload feedback mechanism is activated to perform the following:

checking if a DeferNewRequest flag is set to TRUE indicating that the service provider is overloaded;

if the DeferNewRequest flag is set to TRUE, scheduling and sending the response message to the client, including a response time value (RespTimeValue) that corresponds to an overload state of the service provider;

if the DeferNewRequest flag is set to FALSE, accepting the incoming service request from the client in a service queue for processing;

determining if the incoming service request posted at the service queue makes the service queue to go over a high watermark;

if the incoming service request posted at the service queue makes the service queue to go over the high watermark, computing a larger value for RespTimeValue, setting the DeferNewRequest flag to TRUE, and proceeding to process the incoming service request posted at the service queue; and if the incoming service request posted at the service queue does not make the service queue to go over the high watermark, proceeding to process the incoming service request posted at the service queue.

18. The data network as claimed in claim 17, wherein the dynamic workload feedback mechanism is activated to further perform the following:

removing a service request at the head of the service queue for processing and decrementing a count of pending service requests at the service queue;

determining if a count of pending service requests equals to a high watermark indicating an overload state;

if a count of pending service requests at the service queue equals to the high watermark, setting the DeferNewRequest flag to FALSE to allow all future service requests to be processed, and proceeding to process the incoming service request posted at the service queue;

if a count of pending service requests at the pending service queue is not equal to the high watermark, determining if a count of pending service equals to a low watermark indicating a virtually idle state;

if the count of pending service requests equals to the low watermark, computing a smaller value for RespTimeValue and proceeding to process the incoming service request posted at the service queue; and if the count of pending service requests is not equal to the low watermark, proceeding to process the incoming service request posted at the service queue.

19. The data network as claimed in claim 18, wherein the client is further configured to increase or decrease timeout values to prevent unnecessary timeouts and retries of duplicate service requests.

20. A computer readable medium comprising instructions that, when executed by a host system in a switched fabric including end nodes and switches interconnected via links, cause the host system to:

determine a current workload of the host system, upon receipt of an incoming service request from a client node, via said switched fabric; and send a response message based on the current workload of the host system to the client node, via said switched fabric, including information needed by the client node to issue future service requests to prevent unnecessary timeouts and retries of duplicate service requests.

21. The computer readable medium as claimed in claim 20, wherein the information included in the response message contains a response time value (RespTimeValue) indicating the amount of time the host system expects to respond to the incoming service request based on the workload of the host system.

22. The computer readable medium as claimed in claim 20, wherein the current workload indicates a number of service requests pending in a service queue of the host system to be processed by the host system.

23. The computer readable medium as claimed in claim 20, wherein, when the current workload exceeds a certain level, the host system sets a flag indicating that no new service requests will be accepted for processing, and generates the response message including a larger response time value (RespTimeValue) to inform the client node that the host system is overloaded and needs more time to process service requests.

24. The computer readable medium as claimed in claim 20, wherein, when the current workload falls below a certain level, the host system sets a flag indicating that new service requests will be accepted for processing, and generates the response message including a smaller response time value (RespTimeValue) to inform the client node that the host system is not overloaded and needs less time to process service requests.

* * * * *